United States Patent
Boals et al.

(10) Patent No.: US 11,275,523 B2
(45) Date of Patent: Mar. 15, 2022

(54) PER CURSOR LOGICAL UNIT NUMBER SEQUENCING

(71) Applicant: Micron Technology, Inc., Boise, ID (US)

(72) Inventors: Daniel A. Boals, Broomfield, CO (US); Karl D. Schuh, Santa Cruz, CA (US); Byron D. Harris, Mead, CO (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 17/078,980

(22) Filed: Oct. 23, 2020

(65) Prior Publication Data

US 2021/0042055 A1 Feb. 11, 2021

Related U.S. Application Data

(63) Continuation of application No. 16/205,999, filed on Nov. 30, 2018, now Pat. No. 10,860,243.

(51) Int. Cl.
*G06F 3/06* (2006.01)
(52) U.S. Cl.
CPC .......... *G06F 3/0655* (2013.01); *G06F 3/0604* (2013.01); *G06F 3/0679* (2013.01)
(58) Field of Classification Search
None
See application file for complete search history.

(56) References Cited

U.S. PATENT DOCUMENTS

| | | | | |
|---|---|---|---|---|
| 8,321,643 | B1* | 11/2012 | Vaghani | G06F 3/0665 711/162 |
| 9,747,029 | B2 ‡ | 8/2017 | Porterfield | G06F 12/0246 |
| 9,880,750 | B1 ‡ | 1/2018 | Ravindran | G06F 3/0656 |
| 2006/0047903 | A1* | 3/2006 | Passerini | G06F 3/0683 711/114 |
| 2006/0047998 | A1* | 3/2006 | Darcy | G06F 3/0619 714/6.12 |
| 2015/0169230 | A1 ‡ | 6/2015 | Asnaashari | G06F 3/0688 711/10 |

FOREIGN PATENT DOCUMENTS

| | | | | |
|---|---|---|---|---|
| WO | 2015038741 | A1 | 3/2015 | |
| WO | WO-2015038741 | A1 ‡ | 3/2015 | ........... G06F 3/0619 |
| WO | 2017091641 | A1 | 6/2017 | |
| WO | WO-2017091641 | A1 ‡ | 6/2017 | ........... G06F 16/273 |

OTHER PUBLICATIONS

International Search report and Written Opinion dated Mar. 19, 2020, on Application No. PCT/US2019/062845.‡

* cited by examiner
‡ imported from a related application

*Primary Examiner* — Sean D Rossiter
(74) *Attorney, Agent, or Firm* — Lowenstein Sandler LLP (57) ABSTRACT

A plurality of generators that each correspond to a respective one of a plurality of cursors associated with the plurality of memory devices are identified. A sequence of logical unit numbers (LUNs) of a plurality of sequences of LUNs are generated for each of the cursors based on a respective generator corresponding to the plurality of cursors. Each of the cursors are directed to perform a memory operation on a set of LUNs in an order provided by the sequence of LUNs that is associated with each of the plurality of cursors.

20 Claims, 6 Drawing Sheets

| Generator (g) 310 | Sequence of LUNs 315 | | | | | | | | | | | | | | | | |
|---|---|---|---|---|---|---|---|---|---|---|---|---|---|---|---|---|---|
| | 0g, | 1g, | 2g, | 3g, | 4g, | 5g, | 6g, | 7g, | 8g, | 9g, | 10g, | 11g, | 12g, | 13g, | 14g, | 15g | |
| g = 1 => { | 0, | 1, | 2, | 3, | 4, | 5, | 6, | 7, | 8, | 9, | 10, | 11, | 12, | 13, | 14, | 15 } | 315A |
| g = 3 => { | 0, | 3, | 6, | 9, | 12, | 15, | 2, | 5, | 8, | 11, | 14, | 1, | 4, | 7, | 10, | 13 } | 315B |
| g = 5 => { | 0, | 5, | 10, | 15, | 4, | 9, | 14, | 3, | 8, | 13, | 2, | 7, | 12, | 1, | 6, | 11 } | 315C |
| g = 7 => { | 0, | 7, | 14, | 5, | 12, | 3, | 10, | 1, | 8, | 15, | 6, | 13, | 4, | 11, | 2, | 9 } | 315D |
| in Z/(16) -1 = 15 | | | | | | | | | | | | | | | | | |
| g = 15 => { | 0, | 15, | 14, | 13, | 12, | 11, | 10, | 9, | 8, | 7, | 6, | 5, | 4, | 3, | 2, | 1 } | 315E |
| in Z/(16) -3 = 13 | | | | | | | | | | | | | | | | | |
| g = 13 => { | 0, | 13, | 10, | 7, | 4, | 1, | 14, | 11, | 8, | 5, | 2, | 15, | 12, | 9, | 6, | 3 } | 315F |
| in Z/(16) -5 = 11 | | | | | | | | | | | | | | | | | |
| g = 11 => { | 0, | 11, | 6, | 1, | 12, | 7, | 2, | 13, | 8, | 3, | 14, | 9, | 4, | 15, | 10, | 5 } | 315G |
| in Z/(16) -7 = 9 | | | | | | | | | | | | | | | | | |
| g = 9 => { | 0, | 9, | 2, | 11, | 4, | 13, | 6, | 15, | 8, | 1, | 10, | 3, | 12, | 5, | 14, | 7 } | 315H |

Generator (g) 310 g = { 0g, 1g, 2g, 3g, 4g, 5g, 6g, 7g, 8g, 9g, 10g, 11g, 12g, 13g, 14g, 15g}
1 = { 0, 1, 2, 3, 4, 5, 6, 7, 8, 9, 10, 11, 12, 13, 14, 15} 315A
=> gives channel sequencing
3 = { 0, 3, 6, 9, 12, 15, 2, 5, 8, 11, 14, 1, 4, 7, 10, 13} 420A 315B
=> gives channel sequencing
5 = { 0, 5, 10, 15, 4, 9, 14, 3, 8, 13, 2, 7, 12, 1, 6, 11} 420B 315C
=> gives channel sequencing
7 = { 0, 7, 14, 5, 12, 3, 10, 1, 8, 15, 6, 13, 4, 11, 2, 9} 420C 315D
=> gives channel sequencing
15 = { 0, 15, 14, 13, 12, 11, 10, 9, 8, 7, 6, 5, 4, 3, 2, 1} 420D 315E
=> gives channel sequencing
{ 0, 7, 6, 5, 4, 3, 2, 1} + { 0, 7, 6, 5, 4, 3, 2, 1} 420E Note 15 = = 7 in Z/8 so the lun sequencing matches?

in Z/{16} -1 = 15
= 13 is equal to 5 in Z/8 so this will produce the same lun sequencing as 5
in Z/{16} -3 = 13
= 11 is equal to 3 in Z/8 so this will produce the same lun sequencing as 3
in Z/{16} -5 = 11
= 9 is equal to 1 in Z/8 so this will produce the same lun sequencing as 1
in Z/{16} -7 = 9

PER CURSOR LOGICAL UNIT NUMBER SEQUENCING

RELATED APPLICATIONS

This application is a continuation application of co-pending U.S. patent application Ser. No. 16/205,999, filed Nov. 30, 2018, which is hereby incorporated by reference herein.

TECHNICAL FIELD

Embodiments of the disclosure relate generally to memory sub-systems, and more specifically, relate to per cursor logical unit number (LUN) sequencing in memory sub-systems.

BACKGROUND

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory sub-system to store data at the memory components and to retrieve data from the memory components.

BRIEF DESCRIPTION OF THE DRAWINGS

The disclosure will be understood more fully from the detailed description given below and from the accompanying drawings of various implementations of the disclosure.

DETAILED DESCRIPTION

Aspects of the present disclosure are directed to per cursor logical unit number (LUN) sequencing in memory sub-systems. A memory sub-system is also hereinafter referred to as a "memory device". An example of a memory sub-system is a storage device that is coupled to a central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD). Another example of a memory sub-system is a memory module that is coupled to the CPU via a memory bus. Examples of memory modules include a dual in-line memory module (DIMM), a small outline DIMM (SO-DIMM), a non-volatile dual in-line memory module (NVDIMM), etc. In some embodiments, the memory sub-system is a hybrid memory/storage sub-system. In general, a host system can utilize a memory sub-system that includes one or more memory components. The host system can provide data to be stored at the memory sub-system and can request data to be retrieved from the memory sub-system.

Multiple cursors can be used by the memory sub-system to perform a memory operation, such as a write operation to write data from the host system to the memory sub-system. A cursor is responsible of keeping track of when, where, or in what sequence an operation is to be performed on one or more memory components. A cursor can include software (e.g., firmware), hardware, or a combination thereof that manages the execution of a memory operation (e.g., determines where, when, and in what sequence to write data to memory components). In some conventional memory sub-systems, multiple cursors can perform a memory operation on a sequence of logical unit numbers (LUNs) (e.g., unit of memory) of a memory component where each of the multiple cursors uses the same sequence of LUNs. In some memory sub-systems, only one memory operation can be performed on a LUN at a given instance. Cursors that use the same sequence of LUNs often collide where at least two cursors attempt to perform the memory operation on the same LUN at the same time. In such cases, one cursor waits to perform the memory operation on the LUN until the other cursor completes the performance of the memory operation on the same LUN, which reduces parallelism and the speed of the memory sub-system.

For example, cursor A writes to memory components in an order given by the LUN sequence {0, 1, 2, 3, 4}, and cursor B writes to memory components in an order given by the same LUN sequence {0, 1, 2, 3, 4}. Cursors A and B both begin a write operation on LUN 0, followed by LUN 1, followed by LUN 2, and so forth. If both cursors begin a write operation at approximately the same time, cursors A and B can collide at each LUN in the LUN sequence.

Aspects of the disclosure address the above and other challenges by assigning each of the multiple cursors a generator. In implementations, the generator can be unique to each of the cursors. A respective generator can be used to identify a sequence of LUNs for each of the cursors, where each sequence of LUNs associated with a respective cursor is a unique sequence of LUNs. The cursors can perform the memory operation on the set of LUNs associated with the memory components in an order provided by the respective sequence of LUNs to reduce the probability of collision by the cursors in the performance of the memory operation.

Identifying a sequence of LUNs on a per cursor basis improves the operation of the memory sub-system by improving parallelism and the speed of the performance of memory operations. For example, cursors can concurrently write to more LUNs and more frequently avoid collisions with other cursors by performing memory operations using different sequences of LUNs, rather than performing the memory operations using the same sequence of LUNs.

Figure 1:
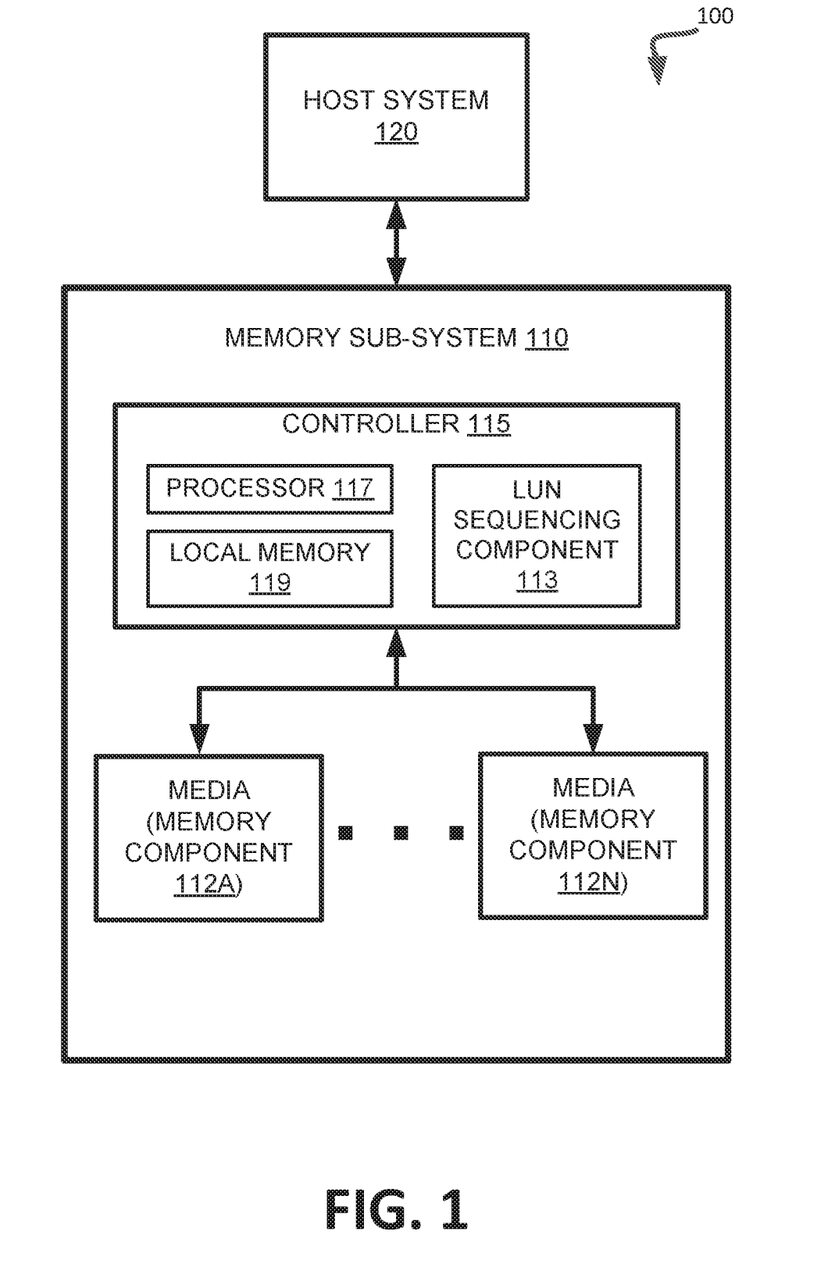
FIG. 1 illustrates an example computing environment that includes a memory sub-system, in accordance with some implementations of the disclosure.

FIG. 1 illustrates an example computing environment 100 that includes a memory sub-system 110, in accordance with some implementations of the disclosure. The memory sub-system 110 can include media, such as memory components 112A to 112N. The memory components 112A to 112N can be volatile memory components, non-volatile memory components, or a combination of such. In some embodiments, the memory sub-system is a storage system. An example of a storage system is a solid-state drive (SSD). In general, the computing environment 100 can include a host system 120 that uses the memory sub-system 110. In some implementations, the host system 120 can write data to the memory sub-system 110 and read data from the memory sub-system 110. In some embodiments, the memory sub-system 110 is a hybrid memory/storage system.

The host system 120 can be a computing device such as a desktop computer, laptop computer, network server, mobile device, or such computing device that includes a memory and a processing device. The host system 120 can include or be coupled to the memory sub-system 110 so that the host system 120 can read data from or write data to the memory sub-system 110. The host system 120 can be coupled to the memory sub-system 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components 112A to 112N when the memory sub-system 110 is coupled with the host system 120 by the PCIe interface. The physical host interface can provide an interface for passing control, address, data, and other signals between the memory sub-system 110 and the host system 120.

The memory components 112A to 112N can include any combination of the different types of non-volatile memory components or volatile memory components. An example of non-volatile memory components includes a negative- and (NAND) type flash memory. Each of the memory components 112A to 112N can include one or more arrays of memory cells such as single level cells (SLCs) or multi-level cells (MLCs) (e.g., triple level cells (TLCs) or quad-level cells (QLCs)). In some implementations, a particular memory component can include both an SLC portion and a MLC portion of memory cells. Each of the memory cells can store bits of data (e.g., data blocks) used by the host system 120. Although non-volatile memory components such as NAND type flash memory are described, the memory components 112A to 112N can be based on any other type of memory such as a volatile memory. In some implementations, the memory components 112A to 112N can be, but are not limited to, random access memory (RAM), read-only memory (ROM), dynamic random access memory (DRAM), synchronous dynamic random access memory (SDRAM), phase change memory (PCM), magneto random access memory (MRAM), negative- or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross point non-volatile memory can perform a write in-place operation, where a non-volatile memory cell can be programmed without the non-volatile memory cell being previously erased. Furthermore, the memory cells of the memory components 112A to 112N can be grouped as memory pages or data blocks that can refer to a unit of the memory component used to store data.

The controller 115 can communicate with the memory components 112A to 112N to perform operations such as reading data, writing data, or erasing data at the memory components 112A to 112N and other such operations. The controller 115 can include hardware such as one or more integrated circuits or discrete components, a buffer memory, or a combination thereof. The controller 115 can be a microcontroller, special purpose logic circuitry (e.g., a field programmable gate array (FPGA), an application specific integrated circuit (ASIC), etc.), or other suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120. In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the disclosure, a memory sub-system 110 may not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory sub-system 110 can include a logical unit number (LUN) sequencing component 113 (e.g., circuitry, dedicated logic, programmable logic, firmware, etc.) to perform the operations described herein. In some implementations, the LUN sequencing component 113 can assign each of the cursors a respective generator. The generators can be used to identify a sequence of LUNs for each of the cursors. The cursors can perform a memory operation on a set of LUNs associated with the memory components 112A to 112N in an order provided by the sequence of LUNs associated with each cursor. Performing the memory operation on the set of LUNs in an order provided by the sequences of LUNs reduces the probability of collision of the cursors in the performance of the memory operation.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the controller 115 and decode the address to access the memory components 112A to 112N.

Figure 2:
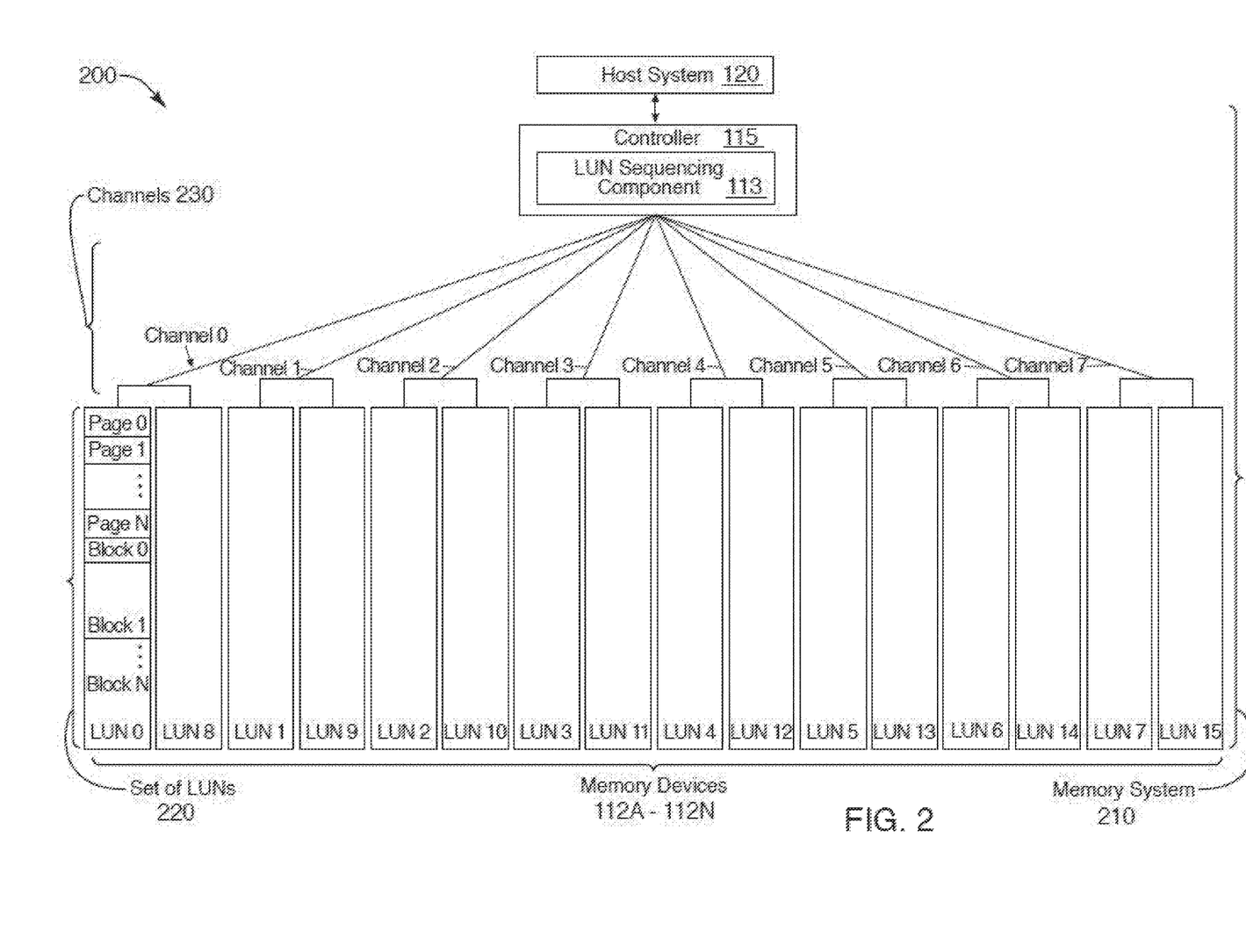
FIG. 2 illustrates another example computing environment that includes a memory sub-system, in accordance with some implementations of the disclosure.

FIG. 2 illustrates another example computing environment 200 that includes a memory sub-system, in accordance with some implementations of the disclosure. Elements of computing environment 100 of FIG. 1 can be used to help illustrate FIG. 2. For example, computing environment 200 includes host system 120, controller 115, and memory components 112A-112N (generally referred to as "memory component(s) 112" herein) of FIG. 1. It can be noted that computing environment 200 is provided for purposes of illustration, rather than limitation. In implementations, computing environment 200 can include some, all, none, more or different elements of computing environment 100 of FIG. 1. It can also be noted that memory sub-system 210 of computing environment 200 can include some, all, none, more or different elements of memory sub-system 110 of FIG. 1.

In some implementations, memory components 112A-112N can include non-volatile memory components, such a solid-state non-volatile memory components (e.g., NAND devices). Solid-state non-volatile memory components that are described herein, are provided for the purpose of illustration rather than limitation. Aspects of the disclosure can be applied to other types of non-volatile memory devices, such as disk storage, or other types of memory devices generally. In some implementations, a memory component 112 can include a set of logical unit numbers (LUN) 220. A LUN can refer to a unit of memory. In some implementations, the unit of memory can be a die of a memory component 112. In other implementations, the unit of memory can be a different amount of memory. In some implementations, each LUN of a set of LUNs 220 can be a same amount of memory. A single memory component 112 can include one or more die configured in a discrete package. As illustrated, the set of LUNs includes 16 LUNs numbered as LUN 0 through LUN 15. In other implementations, the set of LUNs can include any number of LUNs.

In some implementations, a LUN of a memory component 112 can be divided into smaller units of memory. For example, a LUN can include multiple blocks of memory. A block of memory can refer to a smallest unit of a memory component 112 that can be erased responsive to an erase operation. For instance, LUN 0 can include memory block 0 to block N. A block of memory can include multiple pages of memory. A page of memory can refer to a smallest unit of a memory component 112 that can be written responsive to a write operation. For instance, block 0 of LUN 0 can include page 0 to page N. An erase operation removes data from one or more blocks of memory component 112, and a write operation writes data to one or more pages of memory device 112.

In some implementation, one or more channels 230 couple controller 115 with memory components 112. A channel can refer to a connection or coupling between two elements of a computing environment, such as connection or coupling between controller 115 and memory components 112. Channels 230 illustrate 8 channels numbered channel 0 through channel 7. In other implementations, memory sub-system 210 can include any number of channels. In some implementations, the number of channels used to connect to memory components 112 can change, as for example, channels of the computing environment 200 are dynamically repurposed for other uses.

In some implementations, channels 230 can be used by controller 115 to communicate with memory components 112. For example, controller 115 can perform one or more memory operations, such as a write operation, read operation, erase operation, a mapping operation, or garbage collection, on memory components 112. The communication between the controller 115 and the memory component 112 using the channels can use any number of communication protocols, such as protocols that conform to the Open NAND Flash Interface (ONFi) specification. For instance, controller 115 can perform a write operation to write data received from host system 120 to respective LUNs of the memory components 112 using the appropriate channels 230.

In some implementations, a data can be "striped" across memory components 112, such as across multiple LUNs of a set of LUNs 220. Striping (also referred to as "block striping" herein) can refer to a process of dividing a body of data into smaller units and spreading the smaller unites of data across multiple memory components 112. For example, controller 115 can receive data from host system 120. A write operation can be performed on the received data in a manner where controller 115 stripes the data across the memory components 112. For instance, the data can be written on page 0 of block 0 of LUN 0, page 0 of block 0 of LUN 1, page 0 of block 0 of LUN 2, and so forth until the data has been written to memory components 112 in its entirety. The data that is striped across multiple LUNs can be referred to as a block stripe. Block striping can improve the performance of memory sub-system 110. For instance, concurrently writing across multiple LUNs can improve parallelism and improve the speed at which the memory components 112 can be written. It can be noted that for some implementations, no more than one memory operation can be performed on a single LUN at a given instance. For example, a read or write operation (but not both) can be performed on LUN 0 at a given instance.

In some implementations, controller 115 can implement one or more cursors to help execute one or more memory operations on memory components 112. A cursor can include software (e.g., firmware), hardware, or a combination thereof that manages the execution of a memory operation. For example, a cursor can manage a write operation that stripes data across memory components 112. The cursor can manage the sequence of LUNs on which the block striping is performed or be responsible for keeping track of the location (e.g., which LUN) of the cursor is performing a write operation, among other functions.

In implementations, multiple cursors can be implemented by controller 115. In an example, controller 115 can use different cursors to perform different memory operations. For instance, controller 115 can implement a cursor for garbage collection, a cursor for performing a write operation, and so forth. In a further example, controller 115 can implement multiple cursors to perform a single memory operation. For instance, controller 115 can implement multiple cursors (e.g., multiple host cursors) to perform a write operation to write data received from host system 120 to memory components 112.

In some implementations, a cursor can perform a memory operation on memory component 112 in a particular sequence, such as a sequence of LUNs. A sequence of LUNs can refer to an order of LUNs on which a cursor performs a memory operation. For example, a sequence of LUNs for a set of 16 LUNs can be {0, 1, 2, 3, 4, 5, 6, 7, 8, 9, 10, 11, 12, 13, 14, 15} where each integer in the sequence refers to a corresponding LUN in the set of LUNs 220. In performing a write operation using a sequence of LUNs, a cursor can write to LUN 0, then LUN 1, then LUN 2, and so forth in the order provided by the sequence of LUNs. It can be noted that a cursor can write to multiple LUNs concurrently. For example, in the case of three available channels a cursor can concurrently write to LUN 0 to LUN 2, followed by LUN 3 to LUN 5, and so forth in the order provided by the sequence of LUNs.

As noted above, some memory sub-systems assign the same sequence of LUNs to each cursor, which increases the probability of collision of cursors in performing a memory operation. A collision can refer to an instance where two cursors attempt to concurrently perform one or more memory operations on the same LUN. In implementations where a single memory operation can be performed on a LUN at a given instance, the two cursors "collide" when the two cursors try to perform a memory operation on the same LUN at the same time. In such instances, only the first cursor can perform the associated memory operation on the LUN while the second cursor waits to perform the memory operation until the first cursor completes its respective operation. For example, two cursors that perform operations on the set of LUNs 220 using the same sequence of LUNs (e.g., sequence of LUNs {0, 1, 2, 3, 4, 5, 6, 7, 8, 9, 10, 11, 12, 13, 14, 15}) have a higher probability of colliding at one or more LUNs than a situation where two cursors are using different sequences of LUNs to perform respective memory operations.

Figure 3:
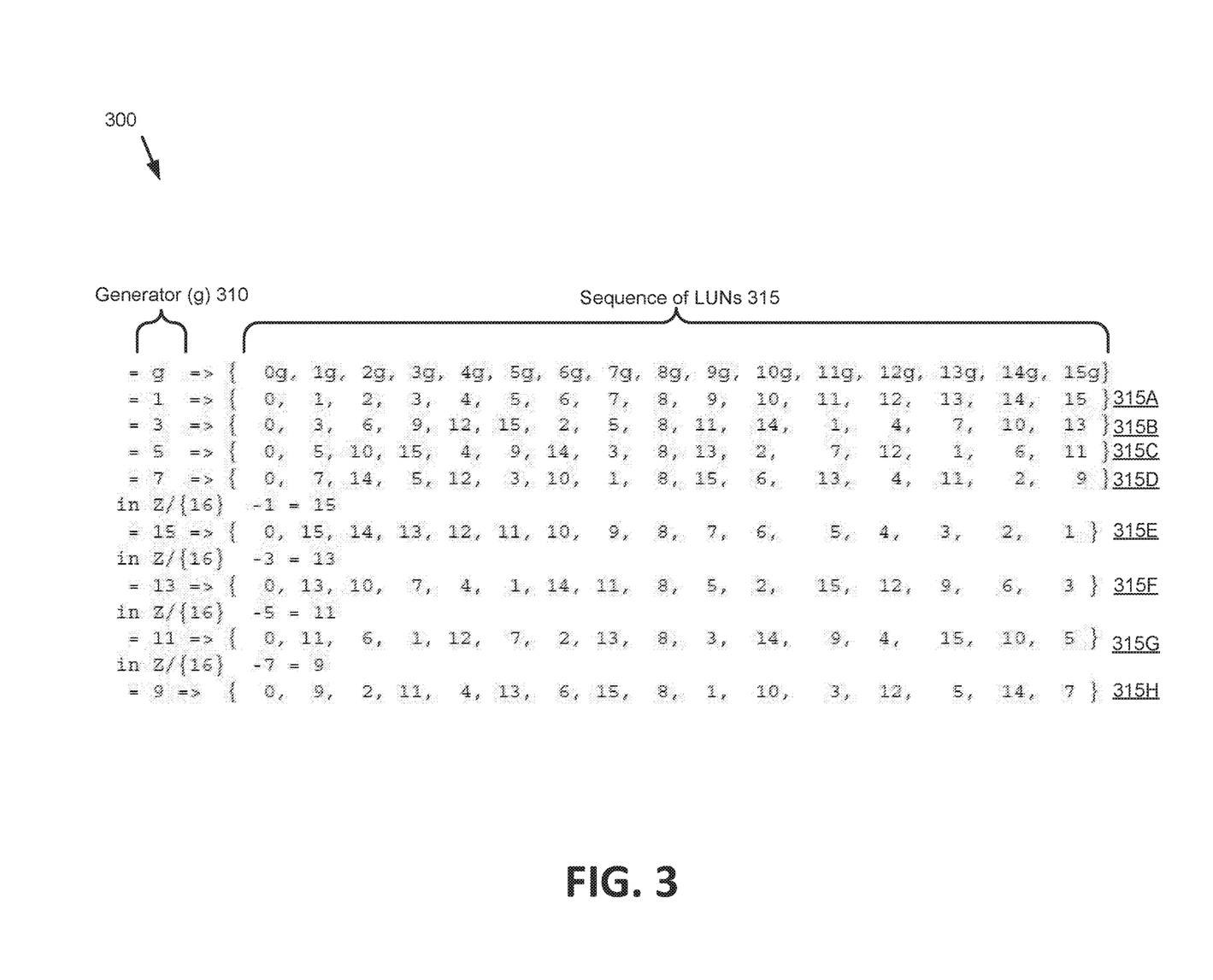
FIG. 3 illustrates sequences of LUNs, in accordance with implementations of the disclosure.

FIG. 3 illustrates an example of LUN sequencing 300, in accordance with implementations of the disclosure. Elements of computing environment 100 of FIG. 1 and computing environment 200 of FIG. 2 can be used to help illustrate FIG. 3. LUN sequencing 300 shows multiple unique sequences of LUNs 315A-315H (generally referred to as "sequence(s) of LUNs 315" herein). Each of the unique sequence of LUNs includes a single instance of each LUN in the set of LUNs 220. As illustrated, each sequence of LUNs is unique in that the order of LUNs in the sequence is not the same for any two of the sequences of LUNs 315.

In implementations, each cursor can perform a memory operation on memory components 112 using a different one of the sequences of LUNs 315. As noted above, cursors that perform memory operations in different orders (by using different sequences of LUNs 315) reduce the probability that two or more of the cursors will collide in the performance of the memory operations. For example, a first cursor can be assigned sequence of LUNs 315A and a second cursor can be assigned sequence of LUNs 315B. The first cursor and the second cursor can perform a write operation on memory components 112 at roughly the same time. The first cursor and the second cursor start writing data on LUN 0 in view of the respective sequence of LUNs 315, which can result in a collision. After writing to LUN 0, the first cursor moves to LUN 1, followed by LUN 2, followed by LUN 3, and so forth. After writing to LUN 0, the second cursor moves to LUN 3, LUN 6, LUN 9, and so forth, which do not overlap with the corresponding LUNs for the first cursor and reduces the probability of collision.

In some implementations, the sequences of LUNs 315 can share characteristics with a finite cyclic group. A finite cyclic group can be a finite group of objects that is generated by a single element. The finite cyclic group includes a set of objects, such as a sequence of a set of LUNs that can be derived from a single invertible associative operation. The finite cyclic group can use a generator (g) such that every object of the group can be obtained by repeatedly applying a group operation or its inverse to the generator.

In implementations, the LUNs (e.g., LUN 0-LUN 15) of the set of LUNs 220 of memory sub-system 210 can be numbered 0 to N, where N is the number of LUNs in the set of LUNs 220 (e.g., N=16 LUNs). If the LUNs are represented by integers (e.g., integers 0-15) and are treated as a finite cyclic group integers (e.g., {0, 1, 2, 3, 4, 5, 6, . . . 15} or set of integers modulo N), a generator of the group is any member "g" of the group for which all members of the group can be expressed a multiple of "g" (i.e., all members of the group can be expressed as m=n*g for some integer n). Any integer of the group with a greatest common divisor (gcd) of 1 with N (e.g., gcd (a, N)=1, where "a" in an integer in the group) can be considered a generator. Additionally, in some implementations where multiple generators are selected to generate sequences with no similar sub-sequences every pair of generators can also have a gcd of 1 (i.e., the only gcd between two generators is 1). An example of similar sub-sequence can be expressed using generators 3 and 9 in the set of Z/{16}. Both 3 and 9 are co-prime with 16. The sequence for 3 collides or is the same as the sequence for 9 on every third number, which can result in unwanted collisions. The sequence for 3 is {0, 3, 6, 9, 12, 15, 2, 5, 8, 11, 14, 1, 4, 7, 10, 13} and the sequence for 9 is {0, 9, 2, 11, 4, 13, 6, 15, 8, 1, 10, 3, 12, 5, 14, 7}.

For example, FIG. 3 shows generators 310 (e.g. 1, 3, 5, 7, 15, 13, 11, 9) and sequences of LUNs 315 associated with each of the generators 310. Sequence of LUNs 315A is the ordered sequence of LUNs 0 through 15. The generator of 1 is always a generator since the gcd of 1 and N (N=16) is always 1. The integer "2" is not a generator because N (e.g., N=16) has a common divisor of 2, so the gcd of 2 and 16 is not 1. The integer 3 is a generator because the gcd of 3 and N (N=16) is always 1. It can be noted that the generators and N can be considered co-prime since the only common divisor between a generator and N is 1. It can also be noted that negative integers can be used as generators, as illustrated. It can be noted that "Z" in FIG. 3 refers to the set of all integers.

In some implementations, the sequences of LUNs 315 can be determined using the respective generators 310. For example, the sequence of LUNs 315B can be determined using the set of integers modulo N, where N is the number of LUNs (e.g., N=16) and the set of integers is ordered sequence of LUNs 0-15 multiplied by the generator. For instance, the set of integers can be {0 g, 1 g, 2 g, 3 g, 4 g, 5 g, 6 g, 7 g, 8 g, 9 g, 10 g, 11 g, 12 g, 13 g, 14 g, 15 g}. For example, 0 g for g=3 is 0, and 0 modulo 16 is 0 (e.g., the remainder of 0/16 is 0), where 0 is the first number in sequence of LUNs 315A. In another example, 6 g for g=3 is 18, and 18 modulo 16 is 2 (e.g., the remainder of 18/16 is 2). Each number of the sequence of LUNs 315B can be determined in a similar manner as illustrated above. It can be noted that the above operation (e.g., algorithm) to generate the sequences of LUNs 315 is provided for illustration, rather than limitation and that one or more operations can be used to generate the sequences of LUNs 315 using generators 310, as further described with respect to FIG. 5.

Figure 4:
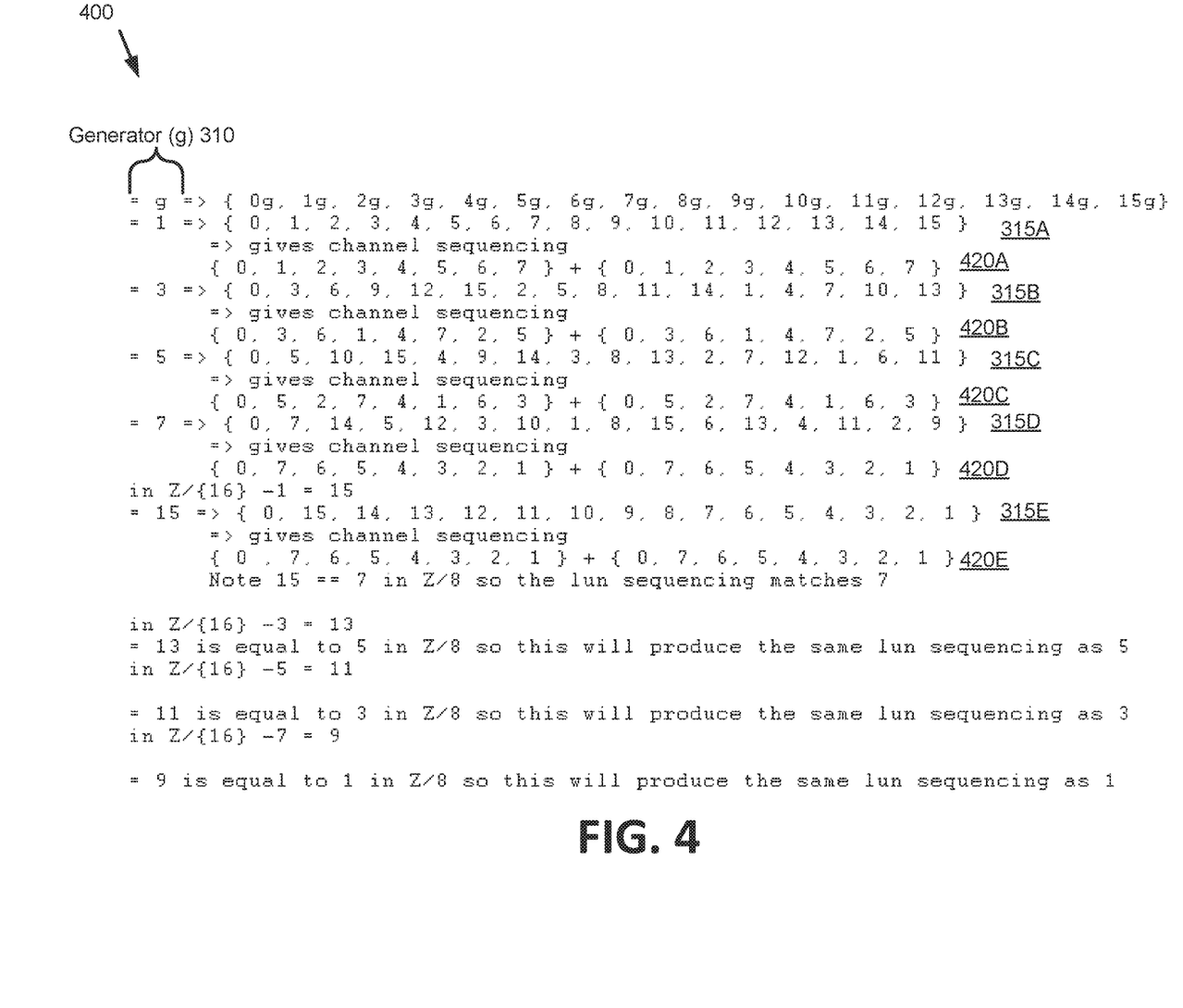
FIG. 4 illustrates sequences of channels, in accordance with implementations of the disclosure.

FIG. 4 illustrates channel sequencing 400, in accordance with implementations of the disclosure. Elements of computing environment 100 of FIG. 1, computing environment 200 of FIG. 2, and LUN sequencing 300 of FIG. 3 can be used to help illustrate FIG. 4. Channel sequencing 400 shows multiple unique sequences of LUNs 315 and the associated sequences of channels 420.

As noted above, controller 115 communicates with the set of LUNs 220 (e.g., LUN 0-LUN 15) via channels 230. Each channel 230 can be coupled to one or more LUNs. In implementations, a cursor that performs a memory operation on a sequence of LUNs, such as one of the sequences of LUNs 315, can access a particular channel to perform the memory operation on the particular LUN of a sequence of LUNs 315.

For example, to perform a write operation in the order indicated by a sequence of LUNs 315A (e.g., {0, 1, 2, 3, 4, 5, 6, 7, 8, 9, 10, 11, 12, 13, 14, 15}), the cursor can access the channels (e.g., channel 0-channel 7 as illustrated in FIG. 2) in the order indicated by the sequence of channels 420A (e.g., {0, 1, 2, 3, 4, 5, 6, 7}+{0, 1, 2, 3, 4, 5, 6, 7}). For instance, to access LUN 0, the cursor can use channel 0, to access LUN 1, the cursor can use channel 1, to access LUN 2, the cursor can use channel 2, and so forth.

In implementations, a sequence of channels 420 can be determined for a given sequence of LUNs 315 so that the cursor can access each channel once before repeating. (e.g., accessing a channel again). Given a set of channels (M), a generator of a finite cyclic group of channels can be any number with a gcd of 1 with M. The positive prime numbers less than M selected for a sequence of LUNs 315 can also be prime generators for the sequence of channels 420. If the number of LUNs (e.g., N=16) is an even multiple of the number of channels (e.g., M=8) and the number of channels is a power of 2, all odd numbers will be a generator for the sequence of channels 420. In some implementations, the number of LUNs can be increased with "dummy" LUNs to make the number of LUNs an even number of the number of channels. The dummy LUNs can be placeholders and the cursors can be instructed to skip the dummy LUNs in the performance of a memory operation. The negative prime numbers selected as generators for the sequences of LUNs 315 can also be generators for the sequences of channels 420.

In implementations, the sequences of channels 420 can be determined in a similar manner as determining the sequences of LUNs 315. A sequence of channels 420 can be determined by a set of integers modulo M, where M is the number of channels (e.g., M=8) and the set of integers is a sequence of LUNs 315. For example, for g=3, the sequence of LUNs 315A is {0, 3, 6, 9, 12, 15, 2, 5, 8, 11, 14, 1, 4, 7, 10, 13}. For LUN 0 of the sequence of LUNs 315B, 0 modulo 8 is 0 (e.g., the remainder of 0/8 is 0) where 0 is the first number in sequence of channels 420B. For LUN 9 of the sequence of LUNs 315B, 9 modulo 8 is 1 (e.g., the remainder of 9/8 is 1) where 1 is the forth number in sequence of channels 420B. The entire sequence of channels 420B includes {0, 3, 6, 1, 4, 7, 2, 5}+{0, 3, 6, 1, 4, 7, 2, 5}, which includes a sequence of channels where all the channels can be used once in the order provided by the sequence of LUNs 315B to access the LUNs before repeating.

Figure 5:
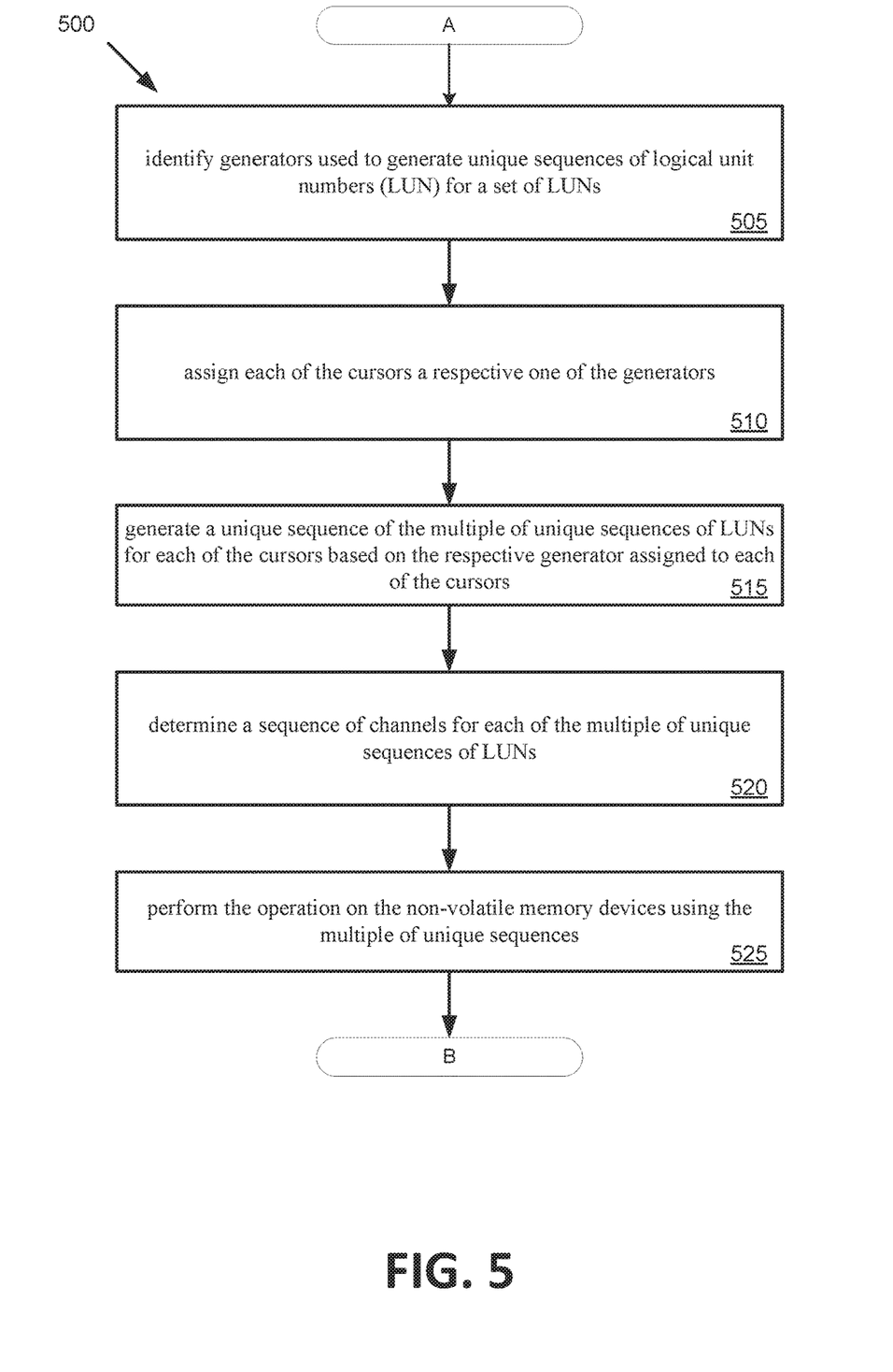
FIG. 5 is a flow diagram of an example method of performing an operation on a memory component using sequences of LUNs, in accordance with some implementations.

FIG. 5 is a flow diagram of an example method of performing an operation on a memory component using sequences of LUNs, in accordance with some implementations. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 500 can be performed by the LUN sequencing component 113 of FIG. 1 or FIG. 2. It can be noted that in other embodiments, method 500 can include the same, different, additional, or fewer operations performed in the same or different order. Elements of the preceding Figures can be used to help illustrated FIG. 5.

At block 505, processing logic identifies generators 310 used to generate sequences of logical unit numbers (LUN) 315 for a set of LUNs 220 associated with memory components 112. In some implementations, each of the sequences of LUNs 315 is a unique sequence. In some implementations, the memory components 112 are non-volatile memory components. In some implementations, generators are unique integers in the range from 1 to a number of LUNs (e.g., N−1 or 0 to 15) in the set of LUNs 220. In some implementations, the generators 310 can be determined at the time of manufacture, and stored in memory that is accessible by controller 115, In other implementations, the generators can be determined using the operation as described with respect to FIG. 3.

At block 510, processing logic assigns each of the cursors a respective one of the generators 310. The cursors are used to perform an operation on the memory components 112. In some implementations, the cursors are multiple host cursors that perform memory operations on behalf of host system 120. In some implementations, the operation is a memory operation, such as a write operation to write data from a host system 120 to memory components 112. In some implementations, the write operation stripes data across the memory components 112.

At block 515, processing logic identifies a sequence of the multiple sequences of LUNs 315 for each of the cursors based on the respective generator (g) assigned to the cursors. In implementations, each of the sequences of LUNs 315 references a single instance of each LUN (e.g., LUN 0-15) in the set of LUNs 220. In implementations, each of the sequences of LUNs 315 is a unique sequence of LUNs where the order of LUNs is different from every other one of the sequences of LUNs 315.

In some implementations, processing logic can store the sequences of LUNs 315 in memory accessible by the controller 115 and access the sequences of LUNs 315 using the generator as an identifier to identify the sequences of LUNs 315.

In other implementations, the generators can be used by the cursors to generate the sequences of LUNs 315. In implementations, processing logic implements an operation (e.g., LUN sequencing algorithm) that uses a respective generator 310 assigned to the cursor as a variable to generate a respective one of the sequences of LUNs 315. In some implementations, the operation that uses the respective generator as a variable to generate unique sequences of LUNs divides each of a set of multiples of a respective generator (e.g., multiples of generator (g) using the multipliers ranging from 0 to N−1 where N is the number of LUNs) by a number of LUNs (i.e., N) in the set of LUNs 220 to generate a remainder (e.g., first value). The remainder identifies a LUN in the sequence of LUNs.

For example, for the sequence of LUNs 315A the generator (g) is 1. The multiples of 1 are 0, 1, 2, 3, 4, 5, . . . 15. Each of the multiples can be divided by the number of LUNs (e.g., N=16) for the set of LUNs 220 (e.g., 1/16, 2/16, 3/16 . . . , 15/16). The remainders of the division are the sequence of LUNs 315A (e.g., {0, 1, 2, 3, 4, . . . , 15}). In another example, for the sequence of LUNs 315B the generator (g) is 3. The multiples of 3 are 0, 3, 6, 9, . . . 45. Each of the multiples can be divided by the number of LUNs (e.g., N=16) for the set of LUNs 220 (e.g., 0/16. 3/16. 19/16, . . . , 45/16). The remainders of the division are the sequence of LUNS 315B (e.g., {0, 3, 6, 9, . . . , 13}).

At block 520, processing logic determines a sequence of channels 420 for each of the sequences of LUNs 315. The channels 230 couple the processing device (e.g., controller 115) to the set of LUNs 220 of the memory components 112. In some implementations, the cursors perform the operation on the set of LUNs 220 in the order provided by the sequence of LUNs 315 by accessing the set of LUNs 220 in an order provided by the respective sequence of channels 420.

In some implementations, a mapping of the LUNs (e.g., LUN 0-15) to the respective channels 230 can be stored in memory (e.g., look-up table) accessible to controller 115. The controller can use the mapping to identify the respective channel to perform the operation on the respective LUN.

In other implementations, the cursor can generate the sequence of channels 420 by implementing an operation (e.g., channel sequencing algorithm). In implementations, to generate a sequence of channels, processing logic can divide each number in a sequence of LUNs 315 by a number of channels (e.g., M=8) to generate a remainder (e.g., second value). The remainder identifies a channel in the sequence of channels. For example, the sequence of LUNs 315B for generator (g=3) is {0, 3, 6, 9, 12, 15, 2, 5, 8, 11, 14, 1, 4, 7, 10, 13}. If the number of channels is 8 (e.g., M=8) each number of sequence of LUNs 315B is divided by 8, and the remainder is a channel in the sequence of channels 420B. FIG. 4 illustrates an additional example of the operation to generate the sequence of channels 420.

At block 525, processing logic performs the operation on the memory components 112 using the sequences of LUNs 315. In implementations, performing the operation on the memory components 112 in the order provided by the sequences of LUNs 315 reduces a probability of collision by the cursors in the performance of the operation (e.g., compared to the cursors using the same sequence of LUNs). In implementations, each of the cursors performs the operation on the set of LUNs 220 in an order provided by the sequence of LUNs 315 that is associated with each of the cursors.

Figure 6:
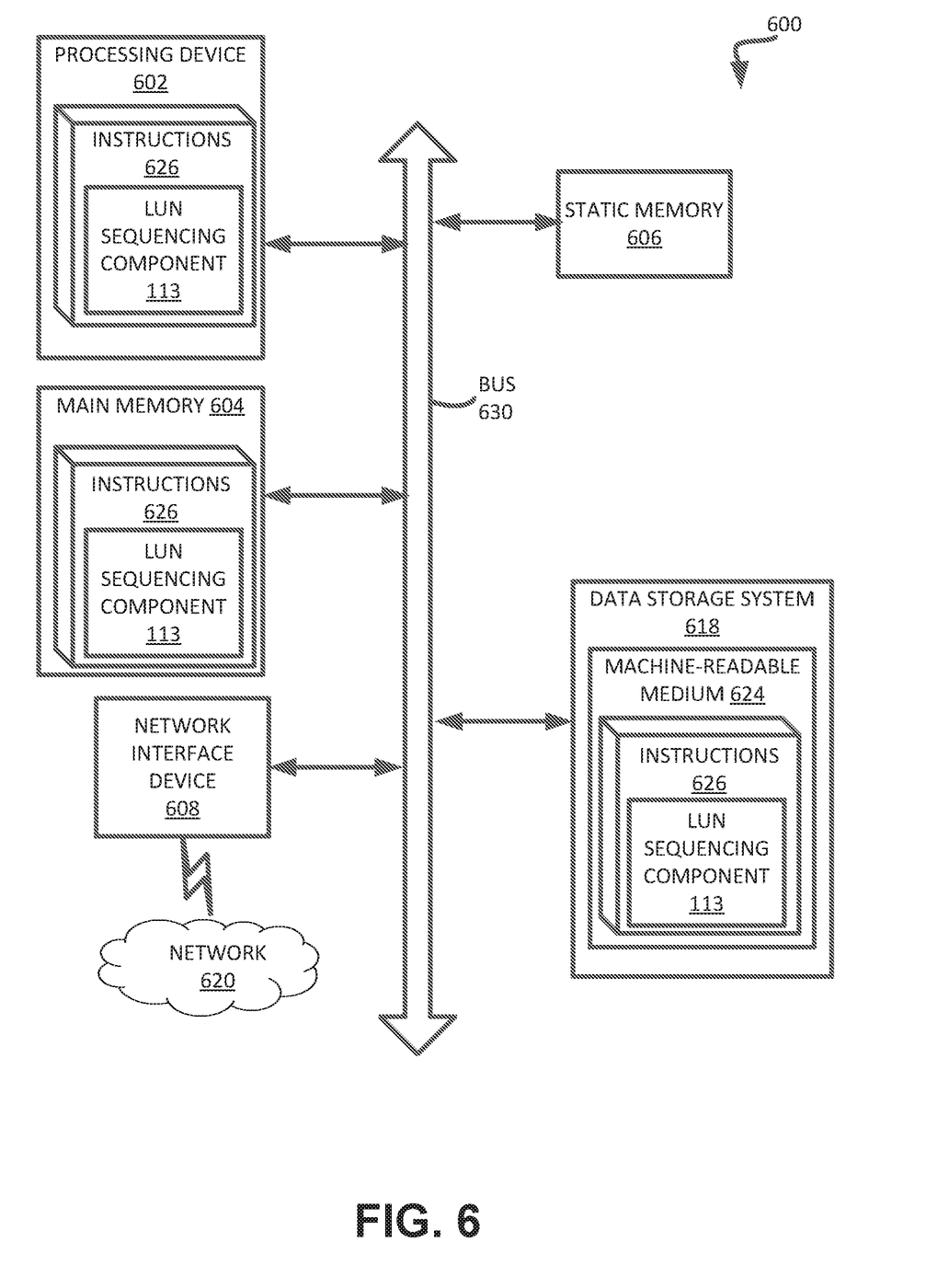
FIG. 6 is a block diagram of an example machine of a computer system in which implementations of the disclosure can operate.

FIG. 6 illustrates an example machine of a computer system 600 within which a set of instructions, for causing the machine to perform any one or more of the methodologies discussed herein, can be executed. In some implementations, the computer system 600 can correspond to a host system (e.g., the host system 120 of FIG. 1 or FIG. 2) that includes or utilizes a memory sub-system (e.g., the memory sub-system 110 of FIG. 1 or memory sub-system 210 of FIG. 2) or can be used to perform the operations of a controller (e.g., to execute an operating system to perform operations corresponding to the LUN sequencing component 113 of FIG. 1 or FIG. 2). In alternative implementations, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1 or memory sub-system 210 of FIG. 2.

In one implementation, the instructions 626 include instructions to implement functionality corresponding to LUN sequencing (e.g., the LUN sequencing component 113 of FIG. 1 or FIG. 2). While the machine-readable storage medium 624 is shown in an example implementation to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications can be made thereto without departing from the broader spirit and scope of implementations of the disclosure as set forth in the following claims. The specification and drawings are, accordingly, to be regarded in an illustrative sense rather than a restrictive sense.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims can generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. The terms "first," "second," "third," "fourth," etc. as used herein are meant as labels to distinguish among different elements and may not necessarily have an ordinal meaning according to their numerical designation.

What is claimed is:

1. A system comprising:
   a plurality of memory devices; and
   a processing device, coupled to the plurality of memory devices, the processing device to:
      identify a plurality of generators that each correspond to a respective one of a plurality of cursors associated with the plurality of memory devices;
      generate a sequence of logical unit numbers (LUNs) of a plurality of sequences of LUNs for each of the cursors based on a respective generator corresponding to the plurality of cursors; and
      direct each of the cursors to perform a memory operation on a set of LUNs in an order provided by the sequence of LUNs that is associated with each of the plurality of cursors.

2. The system of claim 1, wherein each of the sequences of LUNs is a unique sequence of LUNs.

3. The system of claim 1, wherein to generate the sequence of LUNs of the plurality of sequences of LUNs for each of the cursors based on the respective generator corresponding to the plurality of cursors, the processing device is further to:
   implement an operation that uses the respective generator of the plurality of generators as a variable to generate the sequence of LUNs.

4. The system of claim 3, wherein to implement the operation that uses the respective generator of the plurality of generators as the variable to generate the sequence of LUNs, the processing device is further to:
   perform the operation on each of a plurality of multiples of the respective generator using a number of LUNs in the set of LUNs to generate a first value, wherein the first value identifies a LUN in the sequence of LUNs.

5. The system of claim 1, the processing device is further to:
   determine a sequence of channels for each of the plurality of sequences of LUNs, wherein the channels couple the processing device to the set of LUNs of the plurality of memory devices, wherein the cursors perform the memory operation on the set of LUNs in the order provided by the sequence of LUNs by accessing the set of LUNs in an order provided by the respective sequence of channels.

6. The system of claim 5, wherein to determine the sequence of channels for each of the plurality of sequences of LUNs, for each sequence of the plurality of sequences of LUNs, the processing device is further to:
   perform an operation on each number in the sequence of LUNs using a number of channels to be used to generate a second value, wherein the second value identifies a channel in the sequence of channels.

7. The system of claim 1, wherein the memory operation is a write operation to write data from a host system to the plurality of memory devices.

8. The system of claim 7, wherein the write operation stripes the data across the plurality of memory devices.

9. A method, comprising:
identifying a plurality of generators that each correspond to a respective one of a plurality of cursors associated with a plurality of memory devices;
generating, by a processing device, a sequence of logical unit numbers (LUNs) of a plurality of sequences of LUNs for each of the cursors based on a respective generator corresponding to the plurality of cursors; and
directing each of the cursors to perform a memory operation on a set of LUNs in an order provided by the sequence of LUNs that is associated with each of the plurality of cursors.

10. The method of claim 9, wherein each of the sequences of LUNs is a unique sequence of LUNs.

11. The method of claim 9, wherein generating the sequence of LUNs of the plurality of sequences of LUNs for each of the cursors based on the respective generator corresponding to the plurality of cursors, comprises:
implementing an operation that uses the respective generator of the plurality of generators as a variable to generate the sequence of LUNs.

12. The method of claim 11, wherein implementing the operation that uses the respective generator of the plurality of generators as the variable to generate the sequence of LUNs comprises:
performing the operation on each of a plurality of multiples of the respective generator using a number of LUNs in the set of LUNs to generate a first value, wherein the first value identifies a LUN in the sequence of LUNs.

13. The method of claim 9, further comprising:
determining a sequence of channels for each of the plurality of sequences of LUNs, wherein the channels couple the processing device to the set of LUNs of the plurality of memory devices, wherein the cursors perform the memory operation on the set of LUNs in the order provided by the sequence of LUNs by accessing the set of LUNs in an order provided by the respective sequence of channels.

14. The method of claim 9, wherein the memory operation is a write operation to write data from a host system to the plurality of memory devices.

15. The method of claim 14, wherein the write operation stripes the data across the plurality of memory devices.

16. A non-transitory computer-readable medium comprising instructions that, responsive to execution by a processing device, cause the processing device to perform operations comprising:
identifying a plurality of generators that each correspond to a respective one of a plurality of cursors associated with a plurality of memory devices;
generating a sequence of logical unit numbers (LUNs) of a plurality of sequences of LUNs for each of the cursors based on a respective generator corresponding to the plurality of cursors; and
directing each of the cursors to perform a memory operation on a set of LUNs in an order provided by the sequence of LUNs that is associated with each of the plurality of cursors.

17. The non-transitory computer-readable medium of claim 16, wherein each of the sequences of LUNs is a unique sequence of LUNs.

18. The non-transitory computer-readable medium of claim 16, wherein generating the sequence of LUNs of the plurality of sequences of LUNs for each of the cursors based on the respective generator corresponding to the plurality of cursors comprises:
implementing an operation that uses the respective generator of the plurality of generators as a variable to generate the sequence of LUNs.

19. The non-transitory computer-readable medium of claim 18, wherein implementing the operation that uses the respective generator of the plurality of generators as the variable to generate the sequence of LUNs comprises:
performing the operation on each of a plurality of multiples of the respective generator using a number of LUNs in the set of LUNs to generate a first value, wherein the first value identifies a LUN in the sequence of LUNs.

20. The non-transitory computer-readable medium of claim 16, the operations further comprising:
determining a sequence of channels for each of the plurality of sequences of LUNs, wherein the channels couple the processing device to the set of LUNs of the plurality of memory devices, wherein the cursors perform the memory operation on the set of LUNs in the order provided by the sequence of LUNs by accessing the set of LUNs in an order provided by the respective sequence of channels.

* * * * *